United States Patent Office
3,009,912
Patented Nov. 21, 1961

3,009,912
BIS-OXAZINE COMPOUNDS AND METHOD
OF MAKING
Walter Mark Duffin, London, England, assignor to Burroughs Wellcome & Co. (U.S.A.) Inc., Tuckahoe, N.Y., a corporation of New York
No Drawing. Original application June 19, 1956, Ser. No. 592,266. Divided and this application July 21, 1960, Ser. No. 16,202
9 Claims. (Cl. 260—246)

The present invention relates to naphthalene derivatives and the manufacture thereof.

It has been found that naphthalene derivatives of the general Formula I possess valuable antimalarial activity against the blood forms of Plasmodium species, being several times more active than quinine. The compounds have the additional advantages that they act rapidly, can be made simply and cheaply, and are almost tasteless.

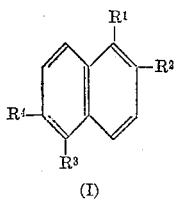

(I)

In this formula one of the groups $R^1$ and $R^2$ and one of the groups $R^3$ and $R^4$ is a hydroxy group; the other of the groups $R^1$ and $R^2$ and of the groups $R^3$ and $R^4$ is a group represented by the formula —$CH_2NHR^5$, in which $R^5$ is a straight or branched alkyl group having from 1 to 8 carbon atoms or a cycloalkyl group having from 5 to 7 carbon atoms in the ring.

The compounds may be presented as their therapeutically acceptable acid-addition salts.

They may be prepared by reacting the appropriate naphthalene-diol with formaldehyde and the appropriate amine $R^5NH_2$ in a suitable solvent such as methanol; the reagents will react on standing or may be heated together. The product of this reaction is a bis-oxazine compound. This oxazine compound is formed adjacent to each of the naphthalene rings by condensation of formaldehyde (which is present in excess during the reaction) uniting the $R^5N$ and the oxygen ortho to it as follows:

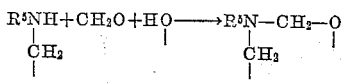

The oxazine rings can be opened and the formaldehyde removed in a manner to be described below.

As an example the following sequence of formulae illustrates the preparation of the compound 2:5-bis(cyclohexylaminomethyl)naphthalene-1:6-diol, which is the preferred compound:

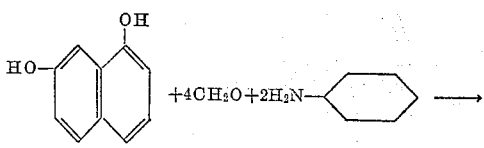

Other valuable compounds may be prepared by starting from naphthalene-1:5-diol or naphthalene-2:6-diol.

The opening of the oxazine rings in a compound of the type in Formula II may be carried out by treating with an acid in a suitable solvent such as aqueous propanol or aqueous isopropanol. For this purpose 10% hydrochloric acid or 2 N sulphuric acid are convenient. The reaction may also be carried out in the cold in the presence of a compound such as 2:4-dinitrophenylhydrazine which will react with formaldehyde as it is formed; this prevents loss of material due to polymerization.

It has also been found that compounds of the type illustrated by Formula II possess an antimalarial activity similar to that possessed by the compounds of Formula I. This is probably due to their conversion in vivo to the latter.

This application is a division of my copending application Serial No. 592,266, filed June 19, 1956, covering the final naphthalene diols of Formula I.

The invention also comprises a method of preparing a compound of the type illustrated by Formula II wherein an appropriate naphthalene-diol is reacted with formaldehyde and an amine $R^5NH_2$.

The invention will now be described with reference to the accompanying examples in which all temperatures are given in degrees Centigrade.

EXAMPLE 1

(a) *2:9-dicyclohexyl-1:2:3:4:7:8:9:10-octahydro-2:9-diaza-4:7-dioxachrysene*

To a mixture of cyclohexylamine (22.8 cc.) and formalin (37 cc.) in methanol (100 cc.) kept at —5° was added a solution of naphthalene-1:6-diol (16 g.) in methanol (150 cc.). After standing overnight, the deposited oily oxazine was stirred with a mixture of ether and water and was filtered. It had a melting point of 130° after crystallization from either ethanol or dioxan.

(b) *2:5-bis(cyclohexylaminomethyl)naphthalene-1:6-diol dihydrochloride*

The oxazine base (5 g.) from (a) was suspended in a mixture of isopropanol (50 cc.) and concentrated hydrochloric acid (2 cc.) and the whole mixture was distilled until formaldehyde was no longer detectable in the distillate (one to three hours), isopropanol being added to keep the volume constant. The mixture was then cooled and was filtered and the solid was washed with cold isopropanol and ether. It was crystallized by solution in 80% ethanol and addition of ether to give a grey solid, melting point 214–215°.

EXAMPLE 2

(a) *2:8-dicyclohexyl-1:2:3:4:7:8:9:10-octahydro-2:8-diaza-4:10-dioxachrysene*

This was prepared as described in Example 1(a) from naphthalene-1:5-diol, and crystallized from dioxan, melting point 183–184°.

(b) *2:6-bis(cyclohexylaminomethyl)naphthalene-1:5-diol hydrochloride*

The above oxazine base (4 g.) was dissolved in dry chloro-form and alcoholic hydrochloric acid added dropwise. The precipitated solid was washed with chloroform and obtained as a white solid, melting point 250° with decomposition.

EXAMPLE 3

(a) *3:9-dicyclohexyl-1:2:3:4:7:8:9:10-octahydro-3:9-diaza-1:7-dioxachrysene*

To a solution of cyclohexylamine (5.7 cc.) in methanol (30 cc.) was added formalin (9.2 cc.) in methanol (20 cc.) and naphthalene-2:6-diol (4 g.) in methanol (25 cc.). The mixture was refluxed on a steam bath for 30 minutes and poured into water (200 cc.). The pale brown solid was crystallized from dioxan to a white solid (6.8 g.), melting point 188°.

(b) *1:5-bis(cyclohexylaminomethyl)naphthalene-2:6-diol hydrochloride*

The oxazine base was hydrolyzed as Example 1(b), giving a white solid, melting point 266–268°.

The following compounds were prepared by methods similar to those employed in the above examples.

(A) From 1:5-dihydroxynaphthalene:
2(a) 2:8 - di - n-propyl-1:2:3:4:7:8:9:10-octahydro-2:8-diaza-4:10-dioxachrysene, melting point 110–115°.
2(b) 2:6 - bis(n - propylaminomethyl)naphthalene-1:5 - diol dihydrochloride, melting point greater than 250° with decomposition.

(B) From 1:6-dihydroxynaphthalene:
3(a) 2:9 - diethyl - 1:2:3:4:7:8:9:10-octahydro-2:9-diaza-4:7-dioxachrysene, melting point greater than 230° with decomposition.
3(b) 2:5 - bis(ethylaminomethyl)naphthalene - 1:6-diol dihydrochloride, melting point 197–199° with decomposition.
4(a) 2:9 - di - n-propyl-1:2:3:4:7:8:9:10-octahydro-2:9-diaza-4:7-dioxachrysene, as an oily solid.
4(b) 2:5 - bis(n - propylaminomethyl)naphthalene-1:6-diol dihydrochloride, melting point 170–172° with decomposition.
5(a) 2:9 - di - n - butyl-1:2:3:4:7:8:9:10-octahydro-2:9-diaza-4:7-dioxachrysene, as an oily solid.
5(b) 2:5 - bis(n - butylaminomethyl)naphthalene-1:6-diol dihydrochloride, melting point 180–182° with decomposition.
6(a) 2:9 - di - n - octyl-1:2:3:4:7:8:9:10-octahydro-2:9-diaza-4:7-dioxachrysene, as an oily solid.
6(b) 2:5 - bis(n - octylaminomethyl)naphthalene-1:6-diol dihydrochloride, melting point 170–175° with decomposition.
7(a) 2:9 - dicyclopentyl - 1:2:3:4:7:8:9:10 - octahydro-2:9-diaza-4:7-dioxachrysene, melting point 140–143° with decomposition.
7(b) 2:5 -bis(cyclopentylaminomethyl)naphthalene-1:6-diol dihydrochloride, melting point 200–205° with decomposition.
8(a) 2:9 - dicycloheptyl - 1:2:3:4:7:8:9:10 - octahydro-2:9-diaza-4:7 - dioxachrysene, melting point 100° with decomposition.
8(b) 2:5 -bis(cycloheptylaminomethyl)naphthalene-1:6-diol dihydrochloride, melting point 205–206° with decomposition.

(C) From 2:6-dihydroxynaphthalene:
9(a) 3:9 - dimethyl - 1:2:3:4:7:8:9:10 - octahydro-3:9-diaza-1:7-dioxachrysene, melting point 198–200° with decomposition.
9(b) 1:5 - bis(methylaminomethyl)naphthalene-2:6-diol dihydrochloride, melting point greater than 300° with decomposition.
10(a) 3:9 - diethyl - 1:2:3:4:7:8:9:10 - octahydro-3:9-diaza-1:7-dioxachrysene, as an oily solid.
10(b) 1:5 - bis(ethylaminomethyl)naphthalene-2:6-diol dihydrochloride, melting point 238–240° with decomposition.
11(a) 3:9 - di - n - propyl - 1:2:3:4:7:8:9:10-octahydro - 3:9 - diaza - 1:7 - dioxachrysene, as an oily solid.
11(b) 1:5 - bis(n - propylaminomethyl)naphthalene-2:6-diol dihydrochloride, melting point greater than 230° with decomposition.
12(a) 3:9 - di - isopropyl-1:2:3:4:7:8:9:10 - octahydro - 3:9-diaza - 1:7 - dioxachrysene, as an oily solid.
12(b) 1:5 - bis(isopropylaminomethyl)naphthalene-2:6-diol dihydrochloride, melting point greater than 240° with decomposition.
13(a) 3:9 - di - n - butyl - 1:2:3:4:7:8:9:10 - octahydro-3:9-diaza-1:7-dioxachrysene, melting point 126–128° with decomposition.
13(b) 1:5 - bis(n - butylaminomethyl)naphthalene-2:6-diol dihydrochloride, melting point 230° with decomposition.
14(a) 3: 9- di-n-pentyl-1:2:3:4:7:8:9:10-octahydro-3:9-diaza-1:7-dioxachrysene, melting point 113–115° with decomposition.
14(b) 1:5 - bis(n - pentylaminomethyl)naphthalene-2:6-diol dihydrochloride, melting point 237–240° with decomposition.

What I claim is:

1. A compound of the formula:

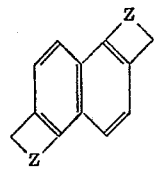

wherein Z is the bivalent radical

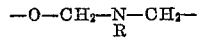

the ends of which are attached to the naphthalene moiety as shown, and R is selected from the class consisting of alkyl having from three to six carbon atoms and cycloalkyl having from five to seven carbon atoms.

2. 2:9-dicyclohexyl - 1:2:3:4:7:8:9:10 - octahydro-2:9-diaza-4:7-dioxachrysene.

3. 2:8-dicyclohexyl - 1:2:3:4:7:8:9:10 - octahydro-2:8-diaza-4:10-dioxachrysene.

4. 3:9-dicyclohexyl-1:2:3:4:7:8:9:10-octahydro-3:9-diaza-1:7-dioxachrysene.

5. 2:8-di-n-propyl-1:2:3:4:7:8:9:10 - octahydro - 2:8-diaza-4:10-dioxachrysene.

6. 2:9 - di - n - butyl - 1:2:3:4:7:8:9:10-octahydro-2:9-diaza-4:7-dioxachrysene.

7. 2:9-dicyclopentyl-1:2:3:4:7:8:9:10-octahydro-2:9-diaza-4:7-dioxachrysene.

8. 3:9-di-isopropyl-1:2:3:4:7:8:9:10 - octahydro-3:9-diaza-1:7-dioxachrysene.

9. 3:9-di-n-pentyl - 1:2:3:4:7:8:9:10 - octahydro - 3:9-diaza-1:7-dioxachrysene.

No references cited.